May 14, 1935. G. A. COOKE 2,001,124
DEVICE FOR TRANSMITTING INTELLIGENCE
Filed April 19, 1930 2 Sheets-Sheet 1
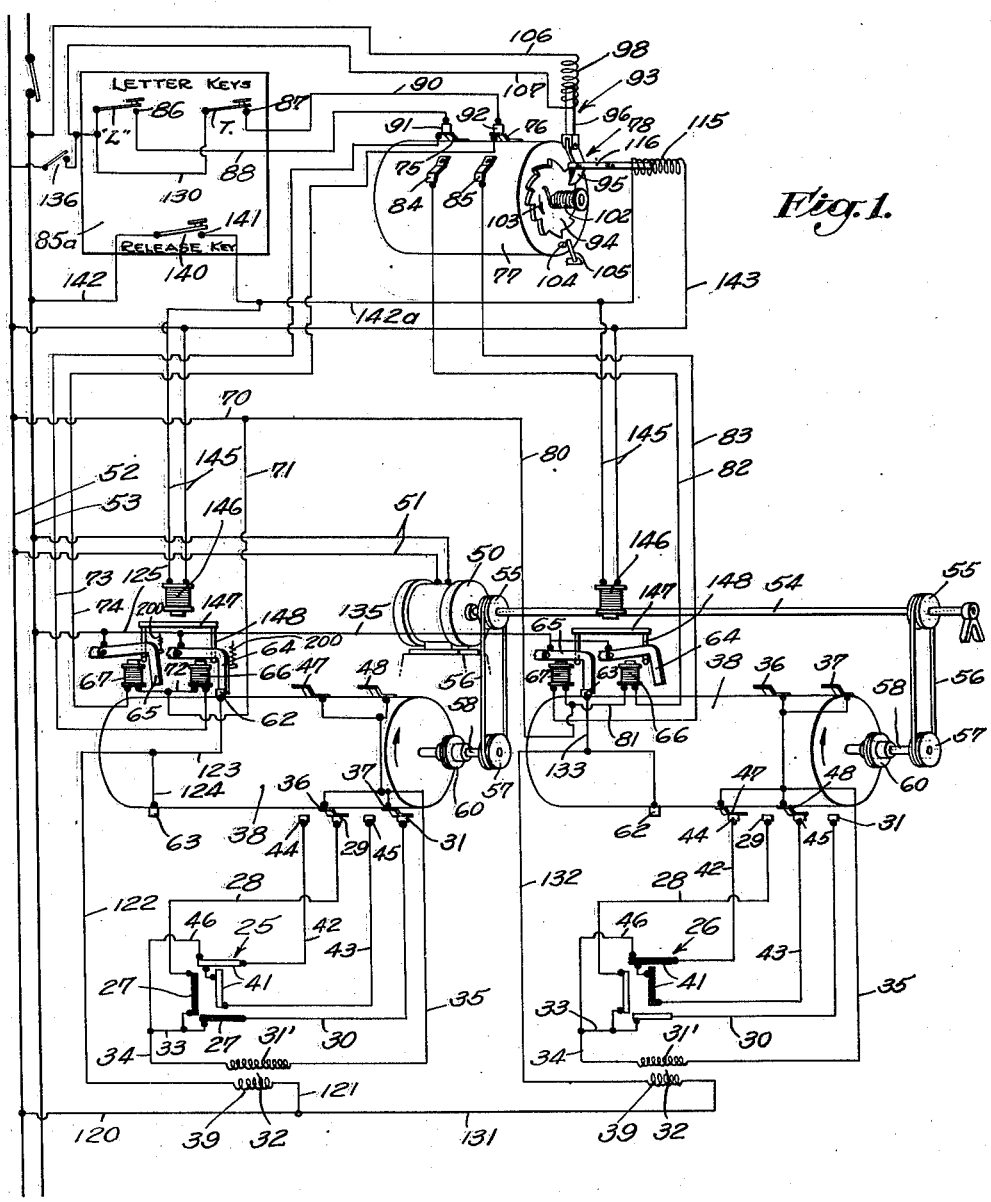
Fig.1.
INVENTOR:
GORDON A. COOKE.
By

May 14, 1935. G. A. COOKE 2,001,124
DEVICE FOR TRANSMITTING INTELLIGENCE
Filed April 19, 1930 2 Sheets-Sheet 2
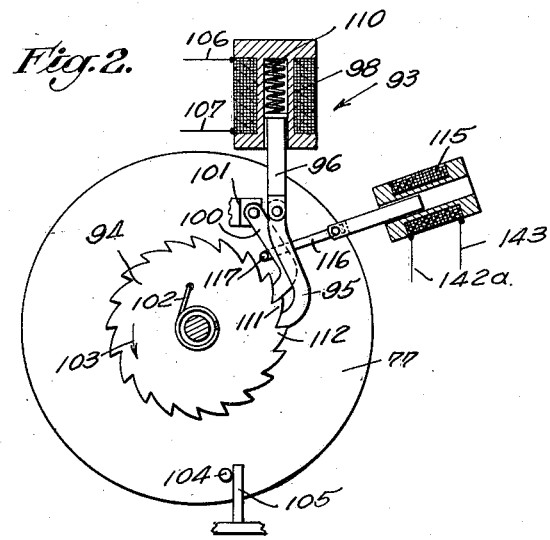
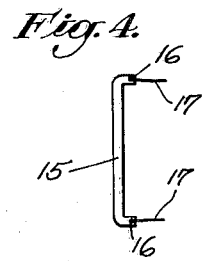
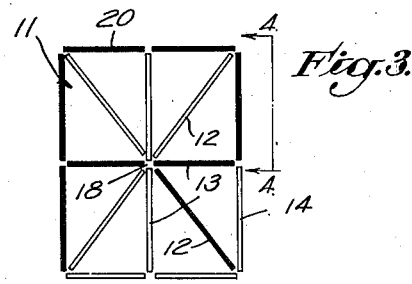
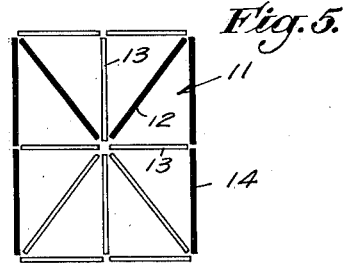
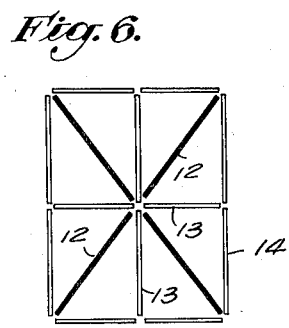
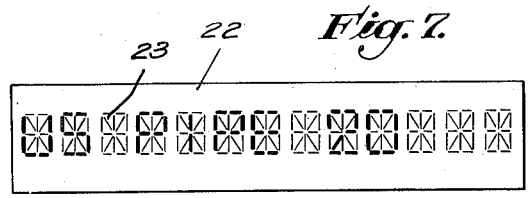
INVENTOR:
GORDON A. COOKE,
By
ATTORNEY.

Patented May 14, 1935

2,001,124

UNITED STATES PATENT OFFICE 2,001,124

DEVICE FOR TRANSMITTING INTELLIGENCE

Gordon A. Cooke, Pasadena, Calif.

Application April 19, 1930, Serial No. 445,669

12 Claims. (Cl. 177—349)

My invention relates to a device for displaying characters in such a manner that intelligence may be transmitted to persons viewing such characters, and my invention further relates to a device of this type which may be selectively actuated to present selected characters or symbols which will impart a message to the viewers thereof.

There are many places where information is imparted to an audience or collected groups of persons by audible means, or by words and characters written on blackboards. As an example of this, most railway stations have a gateman or an attendant who calls out for the benefit of persons in the station information relating to the movement of trains. Also in public gathering places, such as stock brokerage offices, the change in prices of securities offers for the purchase or sale of securities, etc., are accomplished through the calling out of the desired information or the writing thereof on blackboards visible to the assemblage. My invention comprehends a device which may be operated from a remote point to cause a message to appear on a sign or display structure where it may be read by all persons within range of vision, this device being capable of easy and rapid changing of the characters shown thereby so that it will be possible for an operator to display consecutive messages.

It is an object of the invention to provide consecutive character assemblies consisting of character elements or parts and means for rendering combinations of the character parts or elements visible so that symbols such as letters and numerals will appear.

It is a further object of the invention to provide a simple form of operating means for producing the required combination of character elements to form desired symbols, and to further provide actuating means having a keyboard situated at a remote point and by which the operating means of the intelligence transmitting device may be actuated.

It is a further object of the invention to provide a plurality of character or symbol stations, each station having a complement of character forming elements and individual operating means for selecting the combination of character elements whereby to form desired characters, together with a single keyboard and means for consecutively connecting the keyboard to the operating means of the character or symbol stations, thereby making it possible by the use of a single keyboard to consecutively cause the appearance of selected characters in the symbol stations so that a sentence or message will be presented.

A further object of the invention is to provide a simple and novel combination of mechanisms in a device capable of practicing the principles of my invention, further objects and advantages of which will appear throughout the following parts of the specification.

Referring to the drawings, which are for illustrative purposes only,

Fig. 1 is a diagrammatic, schematic view disclosing a preferred embodiment of my invention.

Fig. 2 is a diagrammatic view disclosing a portion of the advancing mechanism.

Fig. 3 is a diagrammatic plan view showing a character or symbol assembly forming part of the invention.

Fig. 4 is an elevational view derived as indicated by the line 4—4 of Fig. 3 and showing one manner of forming a character element from a gaseous discharge tube of the neon type.

Figs. 5 and 6 are views similar to Fig. 3, showing how various combinations of character elements are employed to express characters or symbols.

Fig. 7 is an elevational view showing a display structure having a plurality of character stations or character assemblies mounted consecutively thereon.

A form of character assembly 11 which may be used in the practice of my invention may be formed as shown in Fig. 3 from a plurality of character elements 12, 13, and 14, and these character elements may each consist, as shown in Fig. 4, of an evacuated glass tube 15 containing neon or other gas and having electrodes 16 in the ends thereof to which conductors 17 of electrical circuits are connected. The character elements 12, 13, and 14 are preferably arranged in the form of a rectangle, as shown in Fig. 3. From the approximate center 18 of the rectangle the character elements 13 radiate vertically and horizontally, and the character elements 12 radiate diagonally. Between the adjacent outer end of the radiating character elements 12 and 13 the peripheral character elements 14 are disposed so as to outline a rectangular area. In Fig. 3 illumination of a combination of these character elements 12, 13, and 14 is indicated by drawing them with heavy lines as at 20 so that they will stand out from the remainder of the character elements and in Fig. 3 a combination of character elements is selected and illuminated to express the letter "R".

Figures 5 and 6 respectively indicate how combinations of character elements in a character assembly 11 may be exhibited or illuminated to express other characters or symbols, such for instance as the letters "M" and "X". Although I have shown the character elements 12, 13, and 14 as consisting of illuminable members so that they will be exhibited by illumination in combinations to express desired characters, there are other manners in which the character elements may be formed and other means by which their exhibition may be caused.

In Fig. 7 I show a display member 22 having a plurality of consecutively arranged character elements 23 mounted thereon. This illustration shows the manner in which a message may be displayed by the character assemblies of the display structure 22, thereby transmitting intelligence to all persons viewing the display structure.

In Fig. 1 my complete mechanism for transmitting intelligence is disclosed. This disclosure is purposely simplified in order to avoid the many complications which would result in describing a mechanism of such completeness that all of the characters which might be employed in the visual transmission of intelligence might be expressed thereby. For instance, it is to be understood that one form of device suitable for use in railway stations or stock brokerage offices would have a display structure with from 15 to 30 character assemblies thereon, each of which character assemblies being adapted for and having cooperative mechanism for causing it to display all of the letters of the alphabet and all of the numerals so as to make it possible to form sentences having numbers therein. For the purpose of simplicity, however, I show in Fig. 1 two character assemblies, 25 and 26 respectively, each of which character assemblies is comprised of character elements capable of expressing two symbols which are respectively the letters "L" and "T", it being understood that the number of character assemblies, character elements, and operating mechanisms disclosed in Fig. 1 may be increased as desired without departing from the invention herein disclosed.

The character assemblies 25 and 26 each have character elements 27 adapted to form the letters "L" and "T". These character elements 27 are connected through conductors 28 and 30 with contacts 29 and 31 and are also connected with the secondary 31' of a transformer 32 through conductors 33 and 34. The secondary 31' is connected through a conductor 35 with movable contacts 36 and 37 carried on a selector drum 38. When the selector drum 38 is in such position that the movable contacts 36 and 37 engage the stationary contacts 29 and 31 so that the character elements 27 will be in circuit with the secondary 31', should the transformer 32 be energized through connection of its primary 39 in an electric circuit, the character elements 27 will be illuminated so as to express the letter "L". The character assemblies 25 and 26 also include character elements 41 which are connected through conductors 42 and 43 with stationary contacts 44 and 45. From the character elements 41 conductors 46 and 34 extend to the secondary 31' of the transformer 32. As clearly shown, the conductor 35 connects with a second set of movable contacts 47 and 48, carried by the selector drum 38 so that when the selector drum 38 is in such position that the movable contacts 47 and 48 engage the stationary contacts 44 and 45, the character elements 41 will be in circuit with the transformer 32. By rotating the selector drum so as to bring contacts 36 and 37 into engagement with contacts 29 and 31 the character elements 27 forming the letter "L" may be placed in circuit with the transformer 32 and by further rotating the selector drum so that contacts 47 and 48 engage contacts 44 and 45 the character elements 41 forming the letter "T" may be placed in circuit with the transformer 32. In the operation of the operating means represented by the selector drums 38, a motor 50, connected by conductors 51 with main lines 52 and 53, is adapted to drive the shaft 54 having pulleys 55 thereon over which belts 56 extend to pulleys 57 mounted on shafts 58 axially aligned with the selector drums 38. The shafts 58 are maintained in constant rotation in clockwise direction and through friction plates or clutches 60 power is transmitted to each of the selector drums 38 to likewise rotate them in a clockwise direction. Owing to the presence of the friction plates 60 in the drive mechanism of the drums 38, the drums 38 may be held stationary in positions wherein either set of contacts 36—37 or 47—48 is in position of engagement with cooperating contacts 29—31 or 44—45.

Controlling means for stopping and holding the selector drums 38 in the positions required for engagement of the proper contacts to energize the letter "L" or the letter "T" is shown in the form of stop members 62 and 63 mounted on the drums 38 and cooperative stop members 64 and 65 mounted in positions adjacent to the drums 38 and having magnets 66 and 67 respectively associated therewith for moving the cooperative stop members 64 and 65 into positions for engaging the stops 62 and 63 when it is desired to stop the drums 38 in positions for producing expression of characters or symbols by the character assemblies 25 and 26. The positive terminals of the magnets 66 and 67 associated with the left-hand selector drum 38 are connected with the line wire 52 through conductors 70, 71, and 72. The negative terminals of these same magnets 66 and 67 are respectively connected through conductors 73 and 74 with movable contact members 75 and 76 mounted on a rotary member 77 of an advancing mechanism 78. In a similar manner the magnets 66 and 67 associated with the right-hand drum 38 have their positive terminals connected with the line wire 52 through conductors 70, 80, and 81. The negative terminals of these right-hand magnets 66 and 67 are connected through conductors 82 and 83 with movable contacts 84 and 85 mounted on the rotary member 77.

Adjacent the advancing mechanism 78 I have shown a keyboard 85a having a key "L" and a key "T" mounted thereon, these keys forming parts of switches 86 and 87 which are respectively connected through conductors 88 and 90 with stationary contacts 91 and 92 mounted adjacent the rotary member 77 in such positions that by rotation of the member 77 the contacts 75 and 84 may be caused to consecutively engage the contact 91 and the contacts 76 and 85 may be caused to consecutively engage the contact 92.

The advancing means 78 includes advancing mechanism 93 which may be made in the manner shown in Fig. 2 and consists of a circular ratchet 94 mounted on the rotary member 77, an advancing pawl 95 secured to the armature 96 of a solenoid 98, and a stop pawl 100 hinged to a stationary support 101. A spring 102 normally tends to rotate the ratchet 94 and the rotary member 77 in anti-clockwise direction as indicated by an arrow 103, but this anti-clockwise rotation is normally prevented either by a projection 104 adapted to engage a stationary stop 105 or by the stop pawl 100.

The actuation of the advance mechanism is as follows. When the solenoid 98 is energized through conductors 106 and 107, the armature 96 is drawn upwardly against the downward pressure of a spring 110, lifting the pawl 95 so that it will engage the ratchet tooth 111 immediately above the ratchet tooth 112 with which it normally rests in engagement. Then, on the cutting off of the current to the solenoid 98 the armature 96 is released so that it may move the pawl 95 downwardly under the force of the spring 110, thereby moving the ratchet 94 and the rotary member 77 against the tension of the spring 102 in clockwise direction through an angular distance represented by the spacing of the ratchet teeth 111 and 112. The projection 104 is then moved away from its starting position relative to the stop 105 and anti-clockwise rotation of the members 94 and 77 is prevented by the stop pawl 100. By consecutive electrical impulses imparted to the solenoid 98 the advancing mechanism 93 may be employed to consecutively advance or rotate the rotary member 77. The rotary member 77 may be returned to starting or original position by energizing a releasing solenoid 115 so as to move a pull bar 116 outwardly, this pull bar 116 having an end 117 which extends under the pawls 95 and 100 and lifts them both from engagement with the ratchet 94 so that the spring 102 may rotate the member 77 in anti-clockwise direction to bring the projection 104 into engagement with the stop 105.

Operation of the mechanism is carried on substantially as follows:

Let it be assumed that the advancing means 78 is set in starting position and it is desired to exhibit the letter "L" in the left-hand or first character assembly 25. An operator presses the key "L" of the keyboard 85a and closes the switch 86 thus causing current to flow through from the main line 53 through a conductor 106, the solenoid 98, the conductor 107 which connects with the key "L", the conductor 88, contacts 91 and 75, conductor 73, magnet 66, and conductors 72, 71, and 70 to the main line 52, thereby causing energization of the solenoid 98 and the magnet 66 which results in the lifting of the advance pawl 95 and further results in the pulling of the cooperating stop 64 downwardly into such position that it will be engaged by the stop 62, which is rotating in clockwise direction with the left-hand selector drum 38. The engagement of the stop 62 with the cooperating stop 64 results in stopping the left-hand drum 38 in such position that movable contacts 36 and 37 will engage stationary contacts 29 and 31, thereby closing circuits which include the character elements 27 and the secondary 31' of the transformer 32 and thereby potentially forming the letter L of the character elements 27. The mere engagement of contacts 36 and 37 with contacts 29 and 31 will not cause the character elements 27 to actually form the letter L because such engagement will not cause illumination of the character elements 27 for the reason that current for such illumination must be derived from the transformer 32 which is energized only when one of the stops 62 or 63 is in engagement with the cooperating stop 64 or 65; therefore, during the normal rotation of the drum 38 the intermittent engagement of contacts will not result in intermittent illumination of the character elements 27 or 41. Energization of the transformer 32 results from engagement of the cooperating stop members 64 and 65 with the moving stops 62 and 63, by reason of the fact that the left-hand transformer 32 connects with the main line 52 through conductors 120 and 121 and connects with the stops 62 and 63 through conductor means 122, 123, and 124. The cooperating stops 64 and 65 are connected to a conductor 125 which connects with the main line 53; therefore when the stop 62 is in engagement with the cooperating stop 64, current will flow through the conductors 120 and 121, the primary 39 of the transformer 32, conductors 122 and 123, the stop 62, the cooperating stop 64, and the conductor 125, thereby resulting in energization of the character elements 27, the circuits of which have been closed by cooperation of the contacts 36 and 37 with the contacts 29 and 31.

Lifting of the key "L" so as to open the switch 86 discontinues the flow of current through the solenoids 66 and 98. The de-energization of the solenoid 66 does not raise the stop 64, this stop being frictionally held down through its engagement with the stop 62. However, the advancing pawl 95 is moved downwardly by the spring 110 and thereby rotates the rotary member 77 in clockwise direction to bring the movable contacts 84 and 85 into engagement with the contacts 91 and 92 thus connecting the conductors which lead to the right-hand pair of magnets 66 and 67 with the switches 86 and 87 of the keyboard 85a. The next operation of a key of the keyboard 85a will result in actuation of the control and operating mechanism associated with the second or right-hand character assembly 26.

Should it now be desired to display the letter "T" in the second position of the device, or, in other words, in the character assembly 26, key "T" will be pressed so as to close the switch 87, permitting current to flow from the main line 53 through conductor 106, solenoid 98, conductor 107, conductor 130, switch 87, conductor 90, contacts 92 and 85, conductor 83, magnet 67, and conductors 81, 80, and 70 to the main line 52, thereby energizing the solenoid 98 and the right-hand magnet 67. Energization of this magnet 67 results in moving its cooperating stop 65 into a position for engagement of the stop 63 of the right-hand selector drum 38, causing this right-hand selector drum 38 to stop in such position that its movable contacts 47 and 48 will rest in engagement with the stationary contacts 44 and 45, thereby closing the circuits which include the character elements 41 and the secondary 31' of the right-hand transformer 32. As the result of the stopping of the right-hand selector drum 38 in the above manner, current will flow from the main line 52 through conductor 120, a conductor 131, the primary 39 of the right-hand transformer 32, conductor means 132 and 133, stop 63, cooperating stop 65, and conductors 135 and 125 to the main line 53, thereby causing energization of the right-hand transformer 32 and illumination of the character elements 41 forming the letter "T" in the character assembly 26.

For the purpose of operating the advancing mechanism without formation of a character so as to leave the blank space between characters, I provide a spacing key or switch 136 connecting between the main line 52 and the conductor 107 in the manner shown so that by closing the switch 136 the solenoid 98 may be energized without energization of any other magnet part of the device so as to advance the rotary member 77 and skip one of its contacting positions. When it is desired to erase or remove the letters "L" and "T", a release key 140 may be pressed so as to close the switch 141 and permit current to flow from the main line 53 through a conductor 142, the switch 141, and through a conductor 142a which leads to the releasing solenoid 115, from which solenoid 115 a conductor 143 extends to the main line 52. Flow of current through the solenoid 115 results in the lifting up of the pawls 95 and 100 so as to permit the advancing mechanism to return to starting position.

From the conductors 142a and 143 circuits 145 are extended through releasing magnets 146 associated with the control mechanisms of the actuating means for the character assemblies 25 and 26. The magnets 146 are adapted to be energized when the switch 141 is closed and to lift releasing bars 147 which are provided with extensions 148 for engaging and retracting the cooperating stops 64 and 65, thereby releasing the stops 62 and 63, disilluminating the character elements 27 and 41, and permitting the left and right-hand selector drums 38 to rotate preparatory to actuation in forming additional combinations of characters in the character assemblies 25 and 26. Any suitable means such as small springs 200 may be provided for preventing dropping of the stops 64 and 65 until these stops are selectively lowered by the magnetic means.

Although I have shown a simple and practical form of my invention, it is recognized that parts or elements thereof may be replaced by other parts or elements by which substantially identical results may be accomplished. Therefore it is to be understood that my invention is not limited to the details of the foregoing disclosure but should be accorded the full scope of the following claims.

I claim as my invention:

1. In combination in an intelligence transmitting device: a character assembly comprising a plurality of character elements disposed to form symbols when certain groups thereof are illuminated, each of said character elements comprising a gaseous discharge tube; a transformer having a low voltage primary winding and a high voltage secondary winding; selector means providing terminals electrically connected to said character elements and successively connecting said secondary winding of said transformer to different groups of said character elements; stop means associated with said selector means and stopping said selector means by mechanical engagement therewith when a desired group of said character elements are connected thereto; and means including said stop means for energizing said primary winding after said secondary winding has been connected to said last named group of character elements.

2. In combination in an intelligence transmitting device: a character assembly comprising a plurality of character elements disposed to form symbols when certain groups thereof are illuminated, each of said character elements comprising a gaseous discharge tube; a transformer having a low voltage primary winding and a high voltage secondary winding; selector means providing terminals electrically connected to said character elements and successively connecting said secondary winding of said transformer to different groups of said character elements; a drive means for said selector means; stops on said selector means; stop members, each of which is adapted to contact one of said stops for contacting one of the selector means in a position to connect said secondary winding to a desired group of said character elements; means for selectively actuating said stop members; and a supply circuit including the primary winding of said transformer and said stop and stop member whereby said primary winding is energized when said stop engages said stop member.

3. In combination in an intelligence transmitting device: a character assembly comprising a plurality of character elements; a source of potential; a selector drum adapted when rotated to successively connect said source of potential to different groups of said character elements; a drive means for driving said selector drum; a stop on said drum; a stop member for said stop and so positioned with respect thereto as to stop said selector drum in a position to connect said source of potential to one of said groups of said character elements; remotely controlled means for moving said stop member into advanced position into the path of travel of said stop whereby the movement of said drum is impeded, said stop frictionally engaging said stop member to hold same in said advanced position; and remotely controlled means for withdrawing said stop member from the path of travel of said stop to permit movement of said selector drum.

4. In an intelligence transmitting system the combination of: a sign structure having thereon a plurality of character assemblies each formed of character elements capable when energized in the proper groups of producing symbols; a keyboard means including a switch for each symbol; a source of potential; a selector drum for each of said character assemblies and providing contact means which successively connect different groups of said character elements to said source of potential; a step-by-step means for successively connecting said keyboard means to said selector drums; drive means for said selector drums; and means operated by said switches of said keyboard means for stopping the selector drum associated with any of said character assemblies in a position to illuminate a desired group of said character elements thereon to form a desired symbol.

5. A combination as defined in claim 4 in which said last named means comprises a magnetically operated stop means connected to the switches of said keyboard means through said step-by-step means, and preventing said drive means from rotating said selector drums.

6. A combination as defined in claim 4 in which a single drive means operates all of said selector drums and including a slip clutch between each selector drum and said drive means whereby any of said selector drums may be held stationary without stopping said drive means.

7. In combination in an intelligence transmitting device: a plurality of character assemblies each comprising a plurality of character elements disposed to form symbols when certain groups thereof are illuminated, each of said character elements comprising a gaseous discharge tube; a transformer having a high-voltage secondary winding; a selector means associated with each character assembly and adapted by a continuous movement thereof to successively connect said secondary winding to different of said groups of that one of said character assemblies associated with this selector means and during the time that said transformer is de-energized; drive means for said selector means; stops on each selector means, there being one stop for each group to which said selector means connects; stop means movable into the path of travel of said stops to selectively determine which of said groups is connected to said secondary winding, said stop means stopping the movement of said selector means; means operative successively for successive character assemblies for moving said stop means into the path of travel of said stops; and means for energizing said transformer after said secondary winding is connected to the desired group of character assemblies as determined by said stop means.

8. In combination in an intelligence transmitting device: a plurality of character assemblies each comprising a plurality of character elements capable of being illuminated when energized; a selector drum associated with each of said character assemblies and including a plurality of groups of contacts and a plurality of stops corresponding in number to the number of said groups; means for normally rotating each of said selector drums; electrical means operatively connecting said character elements of each character assembly and said contacts of the corresponding selector drum to connect said contacts to different groups of said character elements of said character assembly when the corresponding selector drum is rotated; a source of potential electrically connected to said last-named means; stop means associated with each selector drum and movable into contact with any of said stops on said drum so that any of said groups of contacts may be connected to said character elements of the corresponding character assembly; a keyboard; and electrically controlled mechanism for consecutively establishing operative connection of said keyboard to said selector drums through said stop means.

9. In combination in an intelligence transmitting device: a plurality of character assemblies each comprising a plurality of character elements capable of being illuminated when energized; a selector means for each of said character assemblies; means for continuously moving each of said selector means; a source of potential; means associated with each selector means for connecting said source of potential to different groups of the character elements on said character assembly; stop means for separately stopping the movement of each of said selector means; a keyboard; electrically actuated means operatively connecting said keyboard and all of said stop means so that any of said stop means of each selector means can be actuated by operation of said keyboard; and electrically controlled step-by-step means associated with said last-named means for successively connecting said keyboard to said selector means.

10. In combination in an intelligence transmitting device: a character assembly comprising a plurality of character elements; a source of potential; a selector drum adapted when rotated to successively connect said source of potential to different groups of said character elements; a drive means; a slip clutch operatively connecting said drive means and said selector drum; a plurality of stops on said selector drum, one stop being provided for each group of said character elements; a stop member associated with each of said stops and individually movable into and from the path of travel of its corresponding stop to impede the movement of said selector drum at a position where said selector drum interconnects said source of potential and one of said groups of character elements; and a circuit controlling the energization of said character elements, said stop members and said stops forming a part of said circuit.

11. In an intelligence transmitting system the combination of: a sign structure having thereon a plurality of character assemblies each formed of character elements capable when energized in the proper groups of producing symbols; a keyboard means including a switch for each symbol; a source of potential; a selector drum for each of said character assemblies and providing contact means which successively connect different groups of said character elements to said source of potential; a step-by-step means for successively connecting said keyboard means to said selector drums; drive means for said selector drums; means operated by said switches of said keyboard means for stopping the selector drum associated with any of said character assemblies in a position to illuminate a desired group of said character elements thereon to form a desired symbol; and release means associated with said last named means for releasing all of said selector drums for rotation.

12. In combination in an intelligence transmitting device: a plurality of character assemblies each comprising a plurality of character elements capable of being illuminated when energized; a selector means for each of said character assemblies; means for continuously moving each of said selector means; a source of potential; means associated with each selector means for connecting said source of potential to different groups of the character elements on said character assembly; stop means for separately stopping the movement of each of said selector means; a keyboard; electrically actuated means operatively connecting said keyboard and all of said stop means so that any of said stop means of each selector means can be actuated by operation of said keyboard; and electrically controlled step-by-step means actuated by operation of said keyboard and associated with said last-named means for successively connecting said keyboard to said selector means.

GORDON A. COOKE.